United States Patent

[11] 3,543,729

| [72] | Inventor | Albert W. Davis |
| | | Bonlee, N.C. |
| [21] | Appl. No. | 788,380 |
| [22] | Filed | Jan. 2, 1969 |
| [45] | Patented | Dec. 1, 1970 |
| [73] | Assignee | Poly-Matic Fountain, Inc., |
| | | Siler City, North Carolina |
| | | a corporation of North Carolina |

[54] AUTOMATIC POULTRY DRINKER
5 Claims, 14 Drawing Figs.

| [52] | U.S. Cl. | 119/80 |
| [51] | Int. Cl. | A01k 07/00 |
| [50] | Field of Search | 119/78, 79, 80 |

[56] References Cited
UNITED STATES PATENTS

| 1,646,245 | 10/1927 | Hawkins | 119/78 |
| 1,933,723 | 11/1933 | Fitzloff | 119/80 |
| 3,157,160 | 11/1964 | Osier | 119/79 |

*Primary Examiner*—Hugh R. Chamblee
*Attorney*—B. B. Olive

ABSTRACT: A poultry drinker and including a float controlled valve to maintain a predetermined level of drinking water and which automatically closes when the drinker is tilted. A plurality of one-way ball valves are employed to control the flow of water from the reservoir to the trough of the poultry drinker.

Patented Dec. 1, 1970

INVENTOR.
Albert W. Davis

BY

*B. B. Olive*

ATTORNEY

Patented Dec. 1, 1970
3,543,729
Sheet 2 of 2
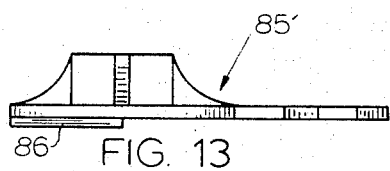
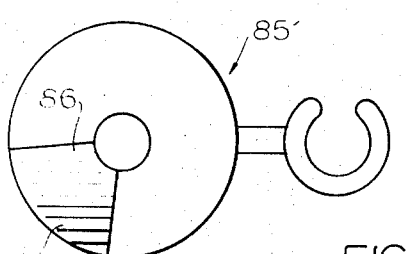
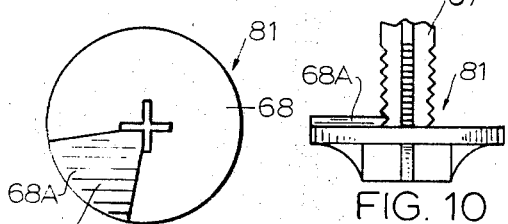
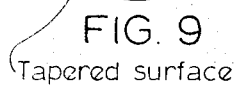
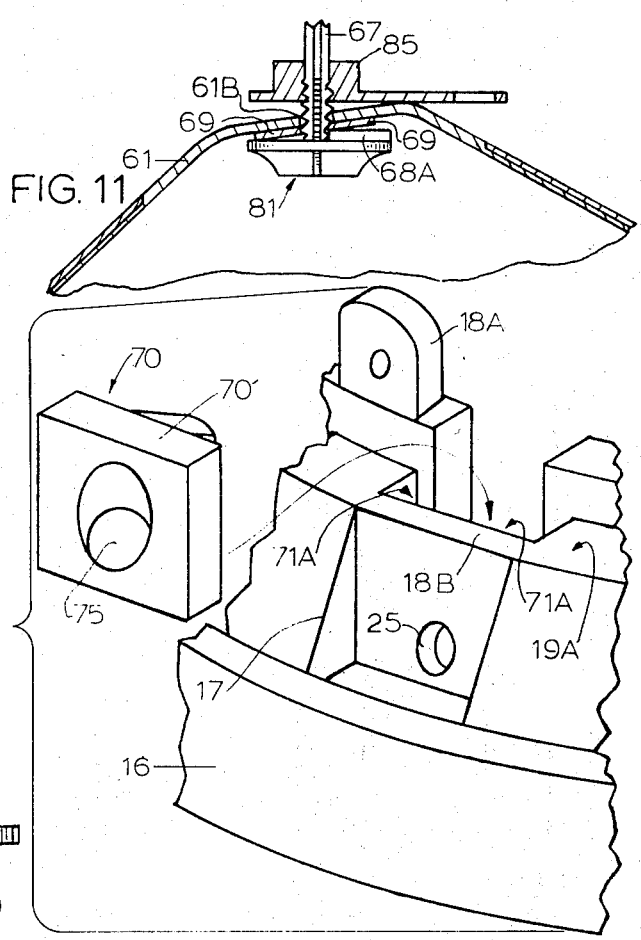
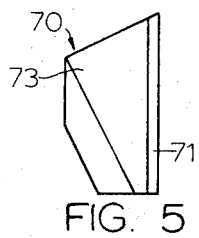
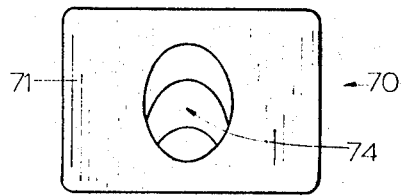
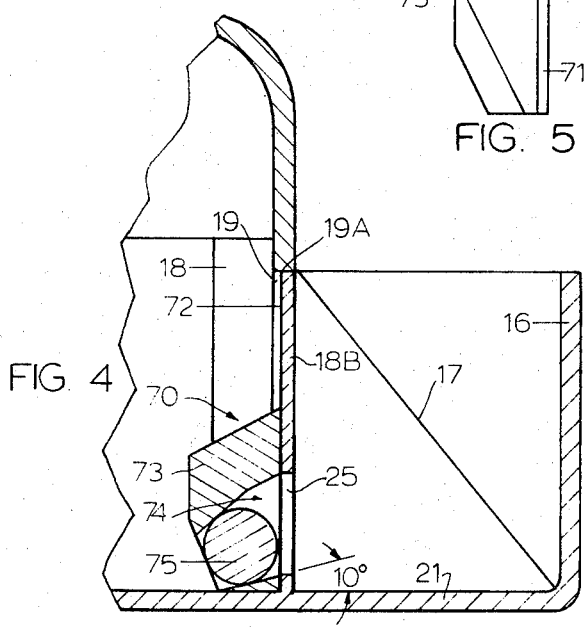
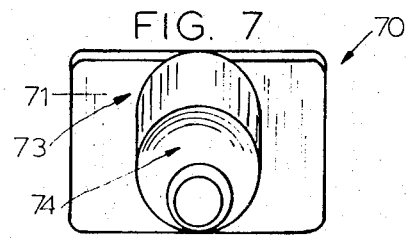
INVENTOR.
Albert W. Davis
BY
B. B. Olive
ATTORNEY

3,543,729

AUTOMATIC POULTRY DRINKER

A poultry drinker utilizes a float controlled and a liquid weight loaded valve to maintain a predetermined level of drinking water in a trough. A sliding cover construction, eccentric leveler and trough ball valve improve both operation and maintenance.

CROSS REFERENCE TO RELATED APPLICATION

The present invention relates to two pending U.S. Pat. applications having the title AUTOMATIC POULTRY DRINKER, Ser. No. 653,757, now U.S. Pat. No. 3,450,102, filed by me and Burton P. Franklin on July 17, 1967 and IMPROVED AUTOMATIC POULTRY DRINKER, Ser. No. 661,650, now U.S. Pat. No. 3,450,103, filed by me on August 18, 1967. The present invention and the subject copending applications are related in that both employ a common type of valve mechanism and water receptacle.

BACKGROUND OF THE INVENTION

1. Field of the Invention

The present invention relates generally to the supplying of water to poultry or like animals and, more particularly, to the intermittent and automatic provision of fresh water to chickens as they grow from small chicks to large sized birds.

2. Description of Prior Art

In order to raise poultry on a commercial scale, various production techniques must be followed in the feeding, watering and general care of the fowl. It is quite common in the raising of broilers, for example, to have buildings which house 10,000 birds and upward. The birds are brought into the house when a day old and remain together throughout their growing period which may range 8 to 12 weeks of age. In the raising of poultry on such a large scale and on the "all-in all-out" method, it is necessary to minimize manual labor and to this end, automatic feeding and watering devices are now widely employed. The automatic watering devices of the prior art are generally comprised of a complex spring-valve mechanism which may or may not include a float. While valve arrangements of this type are satisfactory for some uses, they inherently have the disadvantages of being too costly, being dependent on a particular water pressure, not adapted to being placed on uneven surfaces, being difficult to clean, being difficult to quickly dismantle and reassemble for repair purposes and being adapted to service chicken or fowl of only one size.

A representative prior art patent is U.S. Pat. No. 3,079,892 to Lowery. While the valve mechanism therein is relatively simple, it is gaged to handle only a pressure of a particular force and if the pressure is changed, the water in the inlet forces the float downwardly and allows the water to escape outside of the trough area and onto the floor. Further, if the trough is initially placed on an uneven surface which is most likely to be the rule and not the exception, the float will have a tendency either to be below its normal cutoff position thus allowing excess water to run into the trough area and spill onto the floor or to seat too firmly against the water inlet and prevent any water from entering the system. Also, the level of water in the trough cannot be varied due to the static positioning of the pivot member and water inlet in the housing. This patent is typical of what may be found in the art for it solves some of the problems with which the art is faced while leaving open other problems. Other prior art references may solve problems not solved by Lowery but may have disadvantages not inherent in the Lowery structure.

The apparatus of the copending applications substantially advances the art and is primarily comprised of a housing, a float, a valve and a shiftable liquid weight member. The housing is generally circular in nature and is provided with a peripheral substantially narrow, annular, drinking trench and an interior substantially wide, annular float receptacle both of which are adapted to receive and retain water with the drinking trench receiving its water from the float receptacle. The float which is substantially annular or ringlike is buoyed in the float receptacle by means of the water. The float supports a hollow, liquid filled weight member. The liquid or water weight which loads the inlet control valve tends to force the valve open and allow water to flow from the valve chamber to the float receptacle and then to the drinking trench. Upon any quick and substantial tilting of the housing such as is frequently caused by chickens perching on one side of the drinker, the water weight produces a sloshing effect and causes the valve to shut off the flow of water from the valve. The height of the drinking water in the trench may be lowered or raised by turning an adjusting bolt in the desired direction to create greater or less float movement required to effect seating of the valve from an open position.

SUMMARY OF THE INVENTION

While the drinker apparatus of the copending applications meets all of the objections to the prior art, it has become apparent after extensive field trials of the apparatus of the copending applications that there must be an extremely simple, easy to remove and easy to clean type of one-way valve between the drinking trench and the float receptacle so that the inevitable chicken droppings into the drinking trench can be periodically cleaned from the valve. Between cleanings it is also vitally necessary that the valve operate freely to maintain water in the trench. The operation and maintenance of the receptacle trench valves looms in importance when one considers that a large poultry operation may employ several hundred and possibly several thousand drinkers all of which require proper maintenance and operation.

Another characteristic of the apparatus of the copending applications is that inspection and adjustment of the interior float, liquid weight and valve mechanism requires removal of the entire housing cover and such removal and reinstallation of the cover is time consuming. A further need has arisen for alternate means of providing leveling of the drinker both from the viewpoint of minimizing manufacturing cost as well as the minimizing of the time required to perfect levelling.

In the present invention the highly desirable features of level and tilt sensitivity and substantial insensitivity to water pressure of the apparatus of the copending applications have been maintained and coordinated with improved receptacle to trench valving, improved cover construction and improved levelling means. More particularly, with regard to the valving the present invention provides a one-way ball type valve mounted in an easily removable ball housing so that a set of receptacle trench valves in need of cleaning or periodic maintenance may be quickly removed, cleaned and reinstalled. Furthermore, the type of ball valve disclosed has proven to be positive in operation and uniquely adapted to being operated with the weight loaded type float valve of the copending applications.

The desirable conical shaped housing cover of the copending applications has been maintained by modified in the present invention to include an opening in the cover and a sliding cover section adapted to open and close the opening. Thus, the inner flotation and valving mechanism become accessible for adjustment, inspection and periodic maintenance without requiring removal of the entire housing cover as in the case of the apparatus of the copending applications.

A further improvement is provided by the present invention in that levelling adjustment is achieved by incorporating a levelling cam in the suspension rod structure. Rotation of this cam allows the angle of the suspension rod to be changed with respect to the housing proper and thus by ease and accuracy of levelling maximum sensitivity of the flotation-valving mechanism of the copending applications is maintained.

Thus, the general object of the present invention is to provide a drinker which incorporates the sensitive liquid weight loaded, float controlled type valve of the copending applications while providing an improved cover, an improved receptacle trench valve and an improved levelling means for such type drinker.

Other objects and advantages will appear from the description and drawings.

DESCRIPTION OF THE DRAWINGS

FIG. 1 is a pictorial view of the composite drinker showing the same resting on the floor of the chicken house or the like.

FIG. 4 is a fragmentary section view of a portion of the housing and the one-way ball and valve housing for allowing passage of water from the float receptacle into the drinking trench.

FIG. 5 is a side elevation view of the one-way ball valve housing of FIG. 4.

FIG. 6 is a rear elevation view of the one-way ball valve housing of FIG. 5.

FIG. 7 is a front elevation view of FIG. 5.

FIG. 8 is a fragmentary pictorial view with the ball valve about to be placed into position in the inner vertical wall of the drinking trench.

FIG. 9 is a fragmentary plan view of an eccentric levelling cam molded as an integral part of the suspension rod.

FIG. 10 is a side elevation view of FIG. 9.

FIG. 11 is a fragmentary section view of the eccentric cam of FIGS. 9 and 10 and showing the same in operation with the drinker cover.

FIG. 12 is an alternate embodiment of an eccentric cam.

FIG. 13 is a side elevation view of the eccentric cam of FIG. 12.

DESCRIPTION OF THE PREFERRED EMBODIMENTS

Figure 1:
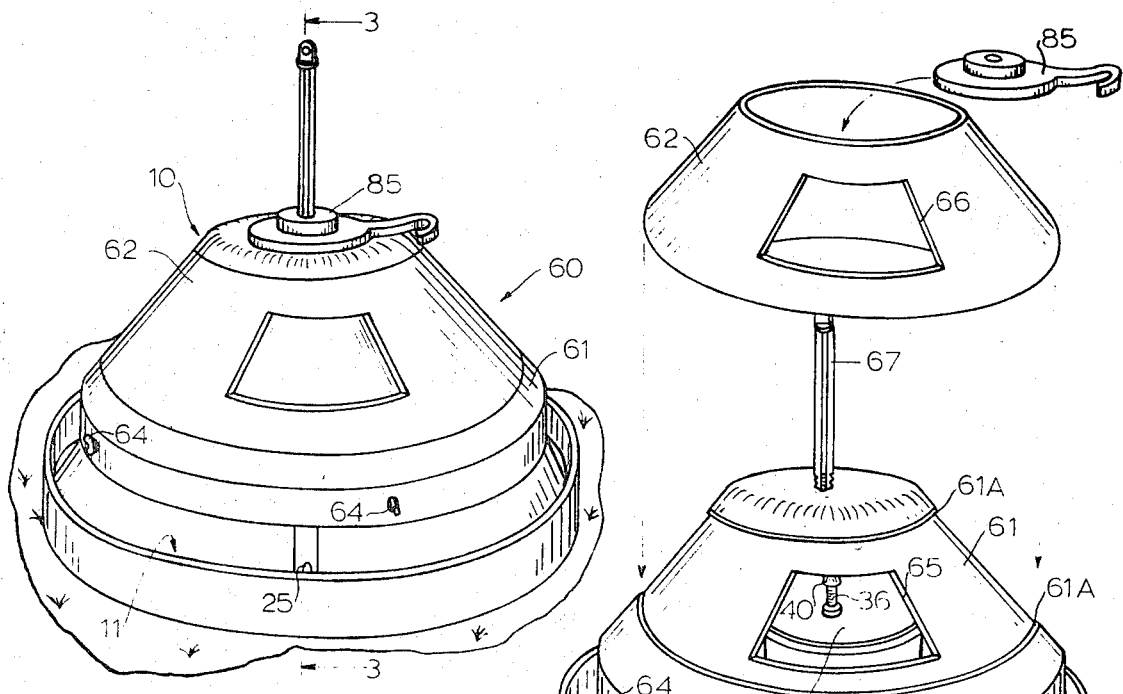
Figure 2:
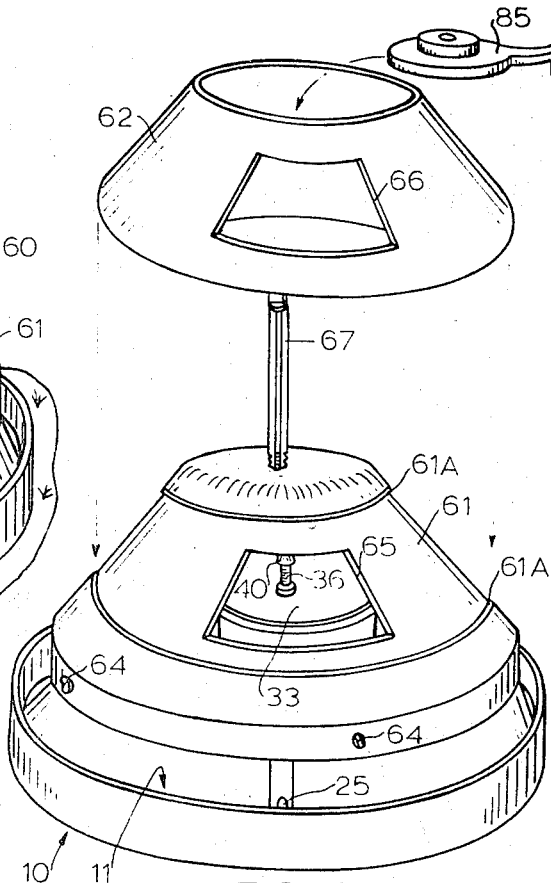
FIG. 2 is an exploded pictorial view of the composite drinker showing the slidable cover portion removed.

As previously mentioned the present invention is directed to improvements over the drinker of the copending applications in respect to a one-way valve which controls flow to the drinking trench, a sliding cover which facilitates adjustment of the main valve and float control mechanism, and a levelling cam for changing the tilt of the drinker when suspended. The description will be first directed to a summary of the components and operation of the drinker as previously disclosed in the copending applications and will then proceed to a description of the three improvements provided by the present invention.

The drinker, generally designated 10, provides a narrow, annular drinking trench 11, a cylindrical, float receptacle 12, a water inlet 13, a valve 14 and valve chamber 15. The trench 11 and receptacle 12 are formed by a vertical wall 16, a sloping wall 17, a connecting wall 18, an inner vertical wall 20, and a bottom wall 21. In operation water flows through valve 14 into the float receptacle 12 and then into the drinking trench 11 through a set of one-way valves which are located in a set of passageways, generally designated 23, and one of which is shown enlarged in FIG. 8.

Float 30 is made of polystyrene or the like and is buoyed in float receptacle 12. A liquid weight receptacle 26 is axially alined with and resides partially within and over an opening 31 formed in float 30. Receptacle 26 includes an inner cylindrical wall 27 which is joined to and extends upwardly from float 30 and an outer wall 28 which in combination with wall 27 forms a liquid cavity 29 which is adapted to receive and retain water 32 or some other suitable weight providing fluid at a desired level necessary to produce the required loading on valve plunger 38. A cover 33, encloses receptacle 26 and has a filler cap 33A on an opening 34 through which cavity 29 may be filled. The referred to water 32 produces a weight effect which loads the valve. When shifted during sudden tilting of the drinker such as by a heavy chicken resting on the edge of the drinker, the water 32 also produces a sloshing effect which has been found to facilitate positive and rapid valve response to tilting.

Figure 3:
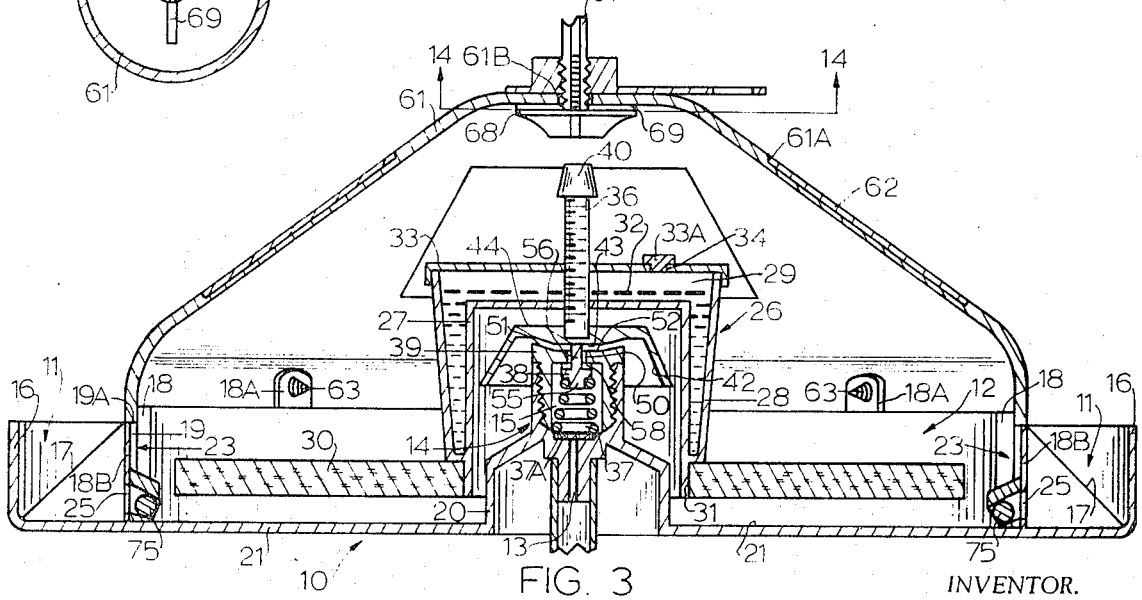
FIG. 3 is a section view of the composite drinker taken along lines 3–3 of FIG. 1 showing the various elements in a normal, level position and with the valve closed.

The composite valve structure 15 includes an adjusting bolt 36, valve chamber 15, spring 37, a filter 37A, plunger 38 and chamber cap 39. Adjusting bolt 36 has a knurled head 40 to facilitate turning and is threadably received by cover 33 as it extends downwardly and is rigidly secured to valve depressor cap 44. As shown in FIG. 3, adjusting bolt 36 is threadably received by and is effectively rigidly secured to valve depressor cap 44 so that when bolt 36 is turned valve depressor cap 44 also turns and this controls the water level in receptacle 12. Valve depressor cap 44 is provided with an inverted frustoconical cavity 42 which forms a raised, flat interior surface 43. Valve chamber 15 is cylinderlike in shape having a threaded inner surface which receives externally threaded cap 39 and is connected to receive pressurized water from water inlet 13. Chamber cap 39 has a circular opening 50 in its top wall 51 and a depression 52 in wall 51 adapted to mate with the interior surface 43 of valve depressor cap 44. Plunger 38 includes a body portion 55 and an integral shaft 56 which has a diameter slightly smaller than the diameter of opening 50 of chamber cap 39. Shaft 56 is adapted to receive a washerlike seat 58 which aids in the shutting off the water through opening 50 when plunger 38 is in a closed position. It is to be noted that the portion of shaft 56 which slidably resides in opening 50 is made slightly longer, about three sixty-fourths of an inch being preferred, than the length of opening 50 as that upon the downward movement of valve depressor cap 44, raised surface 43 of valve depressor cap 44 engages shaft 56 and pushes plunger 38 downwardly against spring 37 so as to provide an outlet for the water residing in valve chamber 15. Thus, a substantial tilting of the drinker such as might be caused by a chicken resting on the drinker causes the raised surface 43 to slip out of contact with plunger 38. Plunger 38 under the influence of spring 37 then seals opening 50 and shuts off further flow of water from valve 14 into float receptacle 12. In such movement any adverse tendency of surface tension or minor dirt particles on the contacting surfaces is counteracted by the liquid sloshing effect of the water or other liquid providing the valve loading weight. It will also be noted that during both level and tilt conditions it is desirable to have responsive, one-way valves that allow flow only from receptacle 12 to trench 11 so as to avoid contamination of receptacle 12 by water from trench 11.

To review the basic operation, it may be noted that water enters inlet 13 from a pressurized source and flows through valve chamber 15, through opening 50 in valve cover 39 and dribbles into float receptacle 12. During normal operation, water is maintained at substantially equal levels in float receptacle 12 and drinking trench 11 by means of the previously mentioned one-way valves, later described, located in the passageways 23. Whenever the level of water in receptacle 12 is sufficient to buoy float 30, float 30 rises and lifts water depressor cap 44 out of contact with valve cap 39 whereupon spring 37 forces plunger 56 upwardly to bring valve seal 58 in contact with the interior wall of valve cap 39 so as to stop the flow of water through opening 50. As the water is consumed by the fowl from drinking trench 11, float 30 is lowered and valve depressor cap 44 contacts plunger 56 and forces it downwardly against spring 37 whereby water is once again allowed to enter drinking trench 11 in the manner just described.

As best explained in the copending applications the drinker is designed to handle chickens both in day old size through any desired number of weeks growth. Thus in use the drinker is first levelled on the floor of the chicken house and as the chickens grow it then becomes necessary to raise the height of the drinking trench 11 and this is accomplished by suspending the drinker as later described. When suspended the drinker can be tilted and any time a chicken perches on the drinker the level of water in one side of the drinking trench 11 becomes greater than the level diametrically opposite therefrom. Also, as the water 32 in receptacle 26 initially shifts and sloshes, float 30 is aided in its lateral movement which causes valve depressor cap 44 to come out of contact with plunger 56. That is, such sloshing effect produces a more rapid and positive valve response to valve tilting. Since shaft 56 is slightly longer than the cylindrical length of opening 50, tilting of the drinker causes plunger 56 to assume its normal closed position and valve seat 58 to reside against the inner wall surface of valve cap 39. Therefore, any substantial tilting of the drinker will close opening 50 and cause the supply of water to float receptacle 12 to be shut off. Thus, whether the drinker is suspended or supported, it will if tilted as by a chicken if suspended, or by being placed on an uneven surface, if supported, will automatically shut itself off.

In order to maintain both the normal level and the abnormal tilt sensitivity of the described operation it is desirable that the drinker cover provide ready access to the interior of the drinker for inspection, adjustment of the water level control bolt 36 and routine maintenance of the described control valve, float and liquid weight mechanism. However, such cover should retain the advantages of the conical shaped cover of the copending applications insofar as it deters roosting of chickens. One feature of the present invention is directed to such an improved cover and this will be next described.

As to the cover construction it will be noted that conical shaped cover 60, comprised of rigid cover 61 and slidable cover 62, is adapted to be attached to mating recessed wall 19 so as to shield the water in float receptacle 12, the float 30, and other interior apparatus from being contaminated by the chickens. Furthermore, such conical shape effectively deters roosting of the chickens on the cover itself. Rigid cover 61 rests on bearing surface 19A and is secured to wall 19 by means of upright extensions 18A formed on connecting wall 18. Holes 63 are formed in cover 61 and wingscrews 64 pass through holes 63 and screw into the extensions 18A for holding cover 61 in place. Cover 61 is provided with a recess the edges of which are indicated at 61A and which extends around cover 61 and is adapted to receive the slidable cover 62 in a sliding relation and when placed thereon presents a smooth, conical, outer surface which maintains the deterrent to chickens roosting on the cover. Cover 61 has an opening 65 which mates with an opening 66 within cover 62 such that then cover 62 is positioned so as to bring these two openings 65, 66 in mating relation access is gained to the interior of the drinker. Furthermore, when cover 62 is slid around so that opening 66 no longer mates with opening 65, the interior is closed and protected from outside contamination. Thus, in comparison to the cover construction of the copending applications it will be seen that access can be gained to the valve, float etc. simply by sliding cover 62. At the same time the advantages of the conical shape are preserved.

Figure 14:
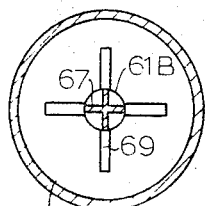
FIG. 14 is a fragmentary section view of the cover interior taken on lines 14–14 of FIG. 3.

A second feature of the invention is directed to an improvement in the suspension and levelling means enabling the drinker level to be readily adjusted when suspended. Two levelling cam arrangements are described both of which are directed to changing the orientation of the suspension rod 67. The first cam arrangement is shown in FIGS. 9, 10, and 11 and the second cam arrangement is shown in FIGS. 12 and 13. In particular, the lower end of rod 67 is molded as an integral end member 81 having a circular disk portion 68. Disk 68 in turn has a slightly less than one-quarter cam section 68A formed of greater thickness than disk 68 and which provides levelling. Cam section 68A in turn preferably has a tapered surface. In FIG. 14 there is shown a fragmentary section view of the upper interior of cover 61 and it will be noted that four narrow ribs 69 (also shown in FIGS. 3 and 11) extend outwardly from the cover opening 61B through which suspension rod 67 passes. Cam section 68A can be positioned, as in FIG. 3, so as to reside between any pair of ribs 69 and provide no levelling effect or it can be positioned to ride on a selected rib 69 as in FIG. 11 and cause the cover 61 to tilt with respect to rod 67 and thereby provide a levelling effect. By forming cam section 68A with a taper the degree of levelling can be controlled by finite adjustment of cam section 68A on a particular rib 69. Once located, the position is secured by tightening of a locking nut and hose guide member 85. The hose which carries water to valve 14 is not shown but it should be understood as being normally carried by the hook portion of member 85 when the drinker is being used in a suspended position.

In a second embodiment of the levelling device, the locking nut and hose guide member 85 is provided with a tapered quarter cam section 86 which should be understood as being similar to cam section 68A. While not shown it should also be understood that for this last embodiment cover 61 is provided with a set of ribs on the outside of the cover similar to ribs 69 shown on the inside of the cover in FIG. 14. It should also be understood that cam section 68A is not employed and the upper surface of disk portion 68 of end member 81 is smooth. That is, for this second levelling embodiment, end member 81 is drawn snug against the inside of cover 61 and levelling is accomplished by rotating cam section 86 with respect to the ribs 69 (now understood for this embodiment as being disposed on the outside of the cover) so as to bring cam section 86 either between a pair of the ribs 69 or on a rib 69. In either embodiment, it can be seen that the cam levelling arrangement lends itself to ease of levelling and thus preserves the sensitivity of the basic liquid weight loaded, float actuated valve of the copending applications.

Mention has already been made of the presence of one-way valves in the passageways 23 and basic function is to allow water to flow from receptacle 12 to trench 11 but not in the reverse direction and under both normal level and tilt conditions. Thus such one-way valves must be sensitive and must respond rapidly and positively to a difference in level between the water in receptacle 12 and that in trench 11. This feature of the present invention is best seen in FIGS. 3 through 8 showing the one-way ball valves generally designated 70 and consisting of a molded plastic housing 70' and a stainless steel ball 75. Housing 70' has a pair of flat extensions 71 which are adapted to be slidably received in the channels 71A formed in portions of connecting wall 18 at the passageways 23. A ball housing 73 protrudes from the extensions 71 and contains a tapered ball passage 74. When the valve 70 is placed in position as shown in FIGS. 3 and 4, it will be noted that a hole 25 formed in a web portion 18B of wall 18 alines with a relatively large opening at one end of ball passage 74 and through which ball 75 is removable. At the opposite end of passage 74 there is another relatively small opening against which ball 75 normally seats. As shown in FIG. 4, the slope of passage 74 is preferably 10°. Such a slope when used with a steel ball of 0.2344 inches in size provides sufficiently strong seating to insure an outward flow of water only when the float receptacle water level is substantially above the trench level and a positive shut off when the two levels approach being the same. Such action insures a minimum contamination of the float receptacle water with the trench water. Of particular importance is the ease of removing the entire valve 70, and of being able to clean ball 75 and passage 74. In this regard it will be noted that simply by loosening screws 64 and removing cover 61, each of the valves 70 may be slipped out of their respective channels and each ball 75 and passage 74 becomes immediately available for inspection and cleaning.

With the described sliding cover, levelling cams and one-way valves it can thus be seen that all of the basic features of the drinker of the copending applications have been preserved while providing a substantial improvement in the operation, inspection and routine maintenance of the drinker. The sliding cover allows quick adjustment of water level over a range of levels corresponding to different chickens being serviced. The levelling cams allows maximum utilization of the basic valve sensitivity when the drinker is suspended. The one-way valves provide sensitivity over the range of water levels and ease of maintenance.

I claim:

1. A poultry drinker, capable when in a normal level position of automatically maintaining a predetermined depth of drinking water and when tilted of shutting off the water supply, comprising:

a. a pan shaped container having side and bottom walls defining an exterior drinking trench and an interior water reservoir connected by a plurality of passageways enabling water to flow from said reservoir to said trench and be maintained at substantially equal levels in each;

b. a valve centrally located in said bottom wall and connected to a water source, said valve including a vertically positionable plunger having an exposed upper end and which when moved downwardly opens said valve to allow water to enter the reservoir and when moved upwardly closes said valve, said valve being spring loaded and normally closed;

c. a buoyant float structure loosely surrounding said valve and floating in said reservoir;

d. valve opening means supported by said float structure above said valve and including a weighted bearing member in loose engagement with said plunger, said bearing member engaging and depressing said plunger and opening said valve upon said water being depleted in said reservoir below some predetermined level and being removed from active engagement with said plunger when said reservoir is refilled to said predetermined level and including an adjusting screw extending above said bearing member and being adapted to regulate said predetermined level by adjusting the position of said bearing member with respect to said float structure;

e. a first substantially smooth conical-shaped cover member having a base removably secured to a selected said side wall inwardly of said trench, said first cover member providing a cover over said reservoir, valve, float structure and valve opening means and having a hand opening therein;

f. a second conical-shaped cover member partially enclosing said first cover member and adapted to rest and slide on and substantially preserve the smooth shape of said first member and having a hand opening adapted to mate with said first cover hand opening in one selected position of said second member and to cover said first cover hand opening in all other positions, said hand openings when mated thereby providing access to and enabling manual adjustment of said screw without requiring removal of said first cover member; and g. a plurality of one-way ball valves one being installed in each said passageway, each said valve having a housing, an open ended water passage extending through said housing and having a slope downwardly towards said reservoir and a control ball loosely mounted in said water passage, said housing being slidably mounted on the selected said sidewall mounting said first cover member enabling each said one-way valve to be removable for cleaning, inspection and the like, one outer end of said water passage operatively mating with an opening in the respective said passageway in which the corresponding one-way valve is installed and the other inner end of said water passage being normally closed by said ball so as to close said passageway, the slope of said water passage and size and weight of said ball being selected so that during a normal operating condition substantially equal levels of water are maintained in said reservoir and trench while simultaneously substantially preventing, both during a said normal as well as during any abnormal tilt condition, flow from said trench to said reservoir and being operative over a range of predetermined different levels established by the regulation of said screw according to the size of chickens being serviced by said trench.

2. A poultry drinker according to claim 1 wherein said ball is a metal ball and said slope approximates a 10° slope.

3. A poultry drinker according to claim 1 including a support rod for suspending said drinker above a poultry house floor, said rod extending through said first cover member and having at its lower end clamping and camming means adapted to be clamped in various positions against selected inner and outer surfaces of said first cover member such that said drinker may be supported by bearing on an inner surface of said first cover member in any such positions while providing with the particular position selected a camming type adjustment in the orientation of said rod with respect to said first cover member thereby enabling selective compensation for tilt of said drinker.

4. The drinker of claim 3 wherein said clamping and camming means provides a camming surface integral with and on the lower end of said rod, said first cover member has inner rib surfaces and said camming surface is adapted to contact selected said inner rib surfaces of said first cover member to compensate for said tilt.

5. The drinker of claim 3 where said clamping and camming means provides a camming surface positionable above said first cover member and rotatably adjustable with respect to said rod, said first cover member has outer rib surfaces and said camming surface is adapted to contact selected said rib surfaces of said first cover member to compensate for said tilt.